(12) United States Patent
Alan Franz, II

(10) Patent No.: US 12,086,066 B1
(45) Date of Patent: Sep. 10, 2024

(54) CACHE ARCHITECTURE FOR A MASSIVELY PARALLEL PROCESSING ARRAY

(71) Applicant: Cornami, Inc., Dallas, TX (US)

(72) Inventor: Martin Alan Franz, II, Dallas, TX (US)

(73) Assignee: Cornami, Inc., Dallas, TX (US)

( * ) Notice: Subject to any disclaimer, the term of this patent is extended or adjusted under 35 U.S.C. 154(b) by 0 days.

(21) Appl. No.: 18/184,536

(22) Filed: Mar. 15, 2023

(51) Int. Cl.
*G06F 12/0813* (2016.01)

(52) U.S. Cl.
CPC .. *G06F 12/0813* (2013.01); *G06F 2212/1041* (2013.01)

(58) Field of Classification Search
CPC ............ G06F 12/0868; G06F 2212/1041
See application file for complete search history.

(56) References Cited

U.S. PATENT DOCUMENTS

| 7,882,307 B1 * | 2/2011 | Wentzlaff ............... G06F 13/16 711/119 |
| 2022/0398196 A1 * | 12/2022 | Shannon ............... G06F 12/128 |

* cited by examiner

Primary Examiner — Tracy A Warren
(74) Attorney, Agent, or Firm — NIXON PEABODY LLP

(57) ABSTRACT

A cache architecture for an array of identical cores arranged in a grid. Each of the cores include interconnections to neighboring cores in the grid, a memory, and an algorithmic logic unit. A first core of the array is configured to receive a memory access request for data from at least one core of the array of cores configured to perform a computational operation. A second core of the array is configured to determine whether the requested data is present in a cache memory via a cache index including addresses in the cache memory. A third core of the array is configured as the cache memory. The memory of the third core is used as the cache memory. An address of the requested data from the cache index is passed to the third core to output the requested data.

19 Claims, 6 Drawing Sheets

CACHE ARCHITECTURE FOR A MASSIVELY PARALLEL PROCESSING ARRAY

TECHNICAL FIELD

The present disclosure relates generally to caches. More particularly, aspects of this disclosure relate to an architecture to provide a cache for processing cores in a massively parallel processing array.

BACKGROUND

Computing systems are increasingly based on homogeneous cores that may be configured for different executing applications. Thus, such cores may be adapted for many different operations and be purposed for various parallel programming tasks. The cores are typically fabricated on a die. Such dies may be fabricated so they may be divided to allocate the needed processing power. The processing performed by such dies thus relies on many cores being employed to divide programming operations. One example of such division may be a streaming model of programming multiple cores that employs different threads that are assigned to different cores.

Such dies therefore have an array of cores that may be selectively employed for different operations such as for massively parallel processing. Groups of the cores are selected for such different operations. Efficient layout selects cores in as close as proximity as possible for the execution of the operations. The layouts may configure cores to perform different computational functions. Typically such functions require access to data that must be stored in an off chip accessible memory such as a high bandwidth memory. However, accessing memory that is off chip is often a time consuming task, thereby impeding the rapid execution of computational tasks. Conventional processors often store required data in cache memory after obtaining the data from an external memory. In this manner, the next time the processor requires access to the data, it may be rapidly accessed by the processor in the cache rather than executing a relatively memory access to external memory.

Traditional hardware cache designs are tuned for specific use cases that are determined during chip manufacturing. Thus, a CPU cache works differently than a GPU cache for example. Specifically, a GPU cache is tuned for triangle rendering access patterns for graphics processing whereas a CPU cache tuned for general purpose CPU access patterns. However, in a homogeneous array of cores that are configurable for different tasks, provision of specifically targeted caches are not possible. Thus, cache memory is not readily available to cores in the array that are generally configured for computational tasks. Thus, operations of such cores are impeded because of the continual need to perform memory access operations to external memory.

Thus, there is a need for an architecture for configuring cores on an array of cores for cache functions. There is a need for a flexible architecture that can adjust the length of cache address lines. There is a further need for a cache architecture that may adjust the amount of cache memory size available.

SUMMARY

One disclosed example is a cache architecture for an array of identical cores arranged in a grid. Each of the cores include interconnections to neighboring cores in the grid, a memory, and an algorithmic logic unit. The cache architecture includes a first core of the array configured to receive a memory access request for data from at least one core of the array of cores configured to perform a computational operation. A second core of the array is configured to determine whether the requested data is present in a cache memory via a cache index including addresses in the cache memory. A third core of the array is configured as the cache memory. The memory of the third core is used as the cache memory. An address of the requested data from the cache index is passed to the third core to output the requested data.

A further implementation of the example cache architecture includes a memory of a fourth core of the array configured as the cache memory in combination with the memory of the third core. Another implementation is where the example cache architecture includes a fourth core of the array configured to manage an external memory. The requested data is written to the third core from the external memory when the requested data is not present. Another implementation is where a suffix of the address is used to designate whether the retrieved data is retrieved from the cache memory or the external memory. Another implementation is where the external memory is a high bandwidth memory. Another implementation is where the data is retrieved via a cache line having an adjustable cache line length. Another implementation is where each of the cores in the array have a first channel, a second channel and a third channel that may each be interconnected to the corresponding first, second and third channels of another core. The third core accepts an address of the requested data on the first channel, outputs the requested data on the second channel if the data is written from the external memory, and outputs the requested data on the third channel if the data is stored in the cache memory. Another implementation is where the example cache architecture includes a fourth core of the array coupled to the third core. The fourth core is configured to return the requested data to the least one of the cores in the array configured for a computational operation. Another implementation is where wherein the at least one core configures a fourth core as the cache memory in response to being configured to perform the computational function.

Another disclosed example is a method of providing a cache memory for an array of cores arranged in a grid. Each of the cores includes interconnections to neighboring cores in the grid, a memory, and an algorithmic logic unit. A first core of the array is configured to receive a memory access request for data from at least one core of the array of cores configured to perform a computational operation. A second core of the array is configured to determine whether the requested data is present in a cache memory via a cache index including addresses in the cache memory. A third core of the array is configured as the cache memory. The memory of the third core is used as the cache memory. An address of the requested data is passed from the cache index to the third core to output the requested data.

A further implementation of the example method includes configuring a memory of a fourth core of the array as the cache memory in combination with the memory of the third core. Another implementation is where the example method includes managing an external memory via a fourth core. The external data is written to the third core from the external memory when the requested data is not present. Another implementation is where a suffix of the address is used to designate whether the retrieved data is retrieved from the cache memory or the external memory. Another implementation is where the external memory is a high bandwidth memory. Another implementation is where the data is retrieved via a cache line having an adjustable cache line length. Another implementation is where each of the cores in the array have a first channel, a second channel and a third channel that may each be interconnected to the corresponding first, second and third channels of another core. The third core accepts an address of the requested data on the first channel, outputs the requested data on the second channel if the data is written from the external memory, and outputs the requested data on the third channel if the data is stored in the cache memory. Another implementation is where the example method includes returning the requested data to the at least one of the cores in the array configured for a computational operation via a fourth core of the array coupled to the third core. Another implementation is where the example method includes configuring a fourth core as the cache memory via the at least one core of the array of cores in response to being configured to perform the computational function.

Another disclosed example is a system on chip includes a high bandwidth memory and a die including an array of cores coupled to an interconnection network. The interconnection network allows access to the high bandwidth memory. Each of the cores in the array of cores include a memory and an algorithmic logic unit. A first core of the array is configured to receive a memory access request for data from at least one core of the array of cores configured to perform a computational operation. A second core of the array is configured to determine whether the requested data is present in a cache memory via a cache index including addresses in the cache memory. A third core of the array is configured as the cache memory. The memory of the third core is used as the cache memory. An address of the requested data from the cache index is passed to the third core to output the requested data.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1A:
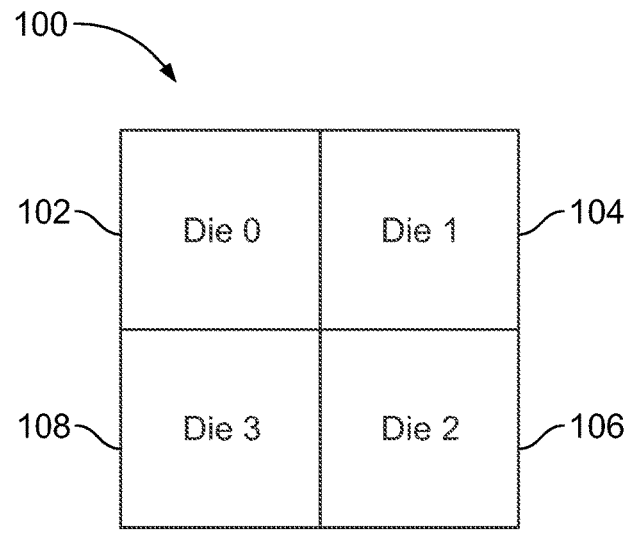
FIG. 1A is a diagram of a chip having four dies each having multiple processing cores.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements, and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is directed toward an architecture that may be created from configuring homogeneous cores in a massively parallel array of cores. The example architecture configures certain cores to perform memory access, cache addressing, and cache storage functions for other cores in the array. In this manner, the architecture allows rapid memory access to data previously accessed from an external memory through the cores that are configured as a cache architecture.

FIG. 1A shows an example chip 100 that is subdivided into four identical dies 102, 104, 106, and 108. Each of the dies 102, 104, 106, and 108 include multiple processor cores, support circuits, serial interconnections and serial data control subsystems. For example, the dies 102, 104, 106, and 108 may each have 4,096 processing cores as well as SERDES interconnection lanes to support different communication protocols. There are die to die parallel connections between the dies 102, 104, 106 and 108. Thus, each of the dies 102, 104, 106, and 108 in this example are interconnected by Interlaken connections. The chip 100 is designed to allow one, two or all four of the dies 102, 104, 106, and 108 to be used. The pins on a package related to un-used dies are left unconnected in the package or the board. The dies are scalable as additional chips identical to the chip 100 may be implemented in a device or a circuit board. In this example, a single communication port such as an Ethernet port is provided for the chip 100. Of course, other ports may be provided, such as one or more ports for each die.

Figure 1B:
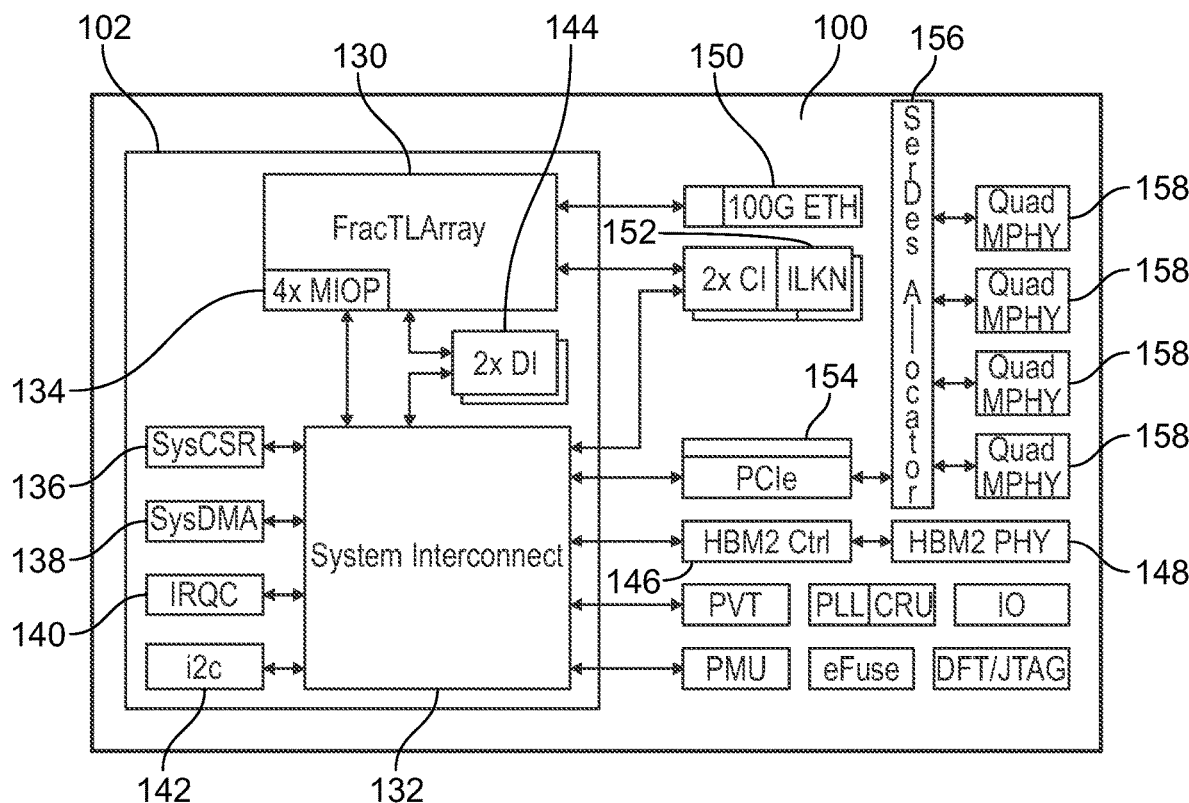
FIG. 1B is a simplified diagram of one of the dies on the chip shown in FIG. 1A.

FIG. 1B is a block diagram of one example of the die 102. The die 102 includes a fractal array 130 of processing cores. The processing cores in the fractal array 130 are interconnected with each other via a system interconnect 132. The entire array of cores 130 serves as the major processing engine of the die 102 and the chip 100. In this example, there are 4096 cores in the fractal array 130 that are organized in a grid.

The system interconnection 132 is coupled to a series of memory input/output processors (MIOP) 134. The system interconnection 132 is coupled to a control status register (CSR) 136, a direct memory access (DMA) 138, an interrupt controller (IRQC) 140, an I2C bus controller 142, and two die to die interconnections 144. The two die to die interconnections 144 allow communication between the array of processing cores 130 of the die 102 and the two neighboring dies 104 and 108 in FIG. 1A.

The chip includes a high bandwidth memory controller 146 coupled to a high bandwidth memory 148 that constitute an external memory sub-system. The chip also includes an Ethernet controller system 150, an Interlaken controller system 152, and a PCIe controller system 154 for external communications. In this example each of the controller systems 150, 152, and 154 have a media access controller, a physical coding sublayer (PCS) and an input for data to and from the cores. Each controller of the respective communication protocol systems 150, 152, and 154 interfaces with the cores to provide data in the respective communication protocol. In this example, the Interlaken controller system 152 has two Interlaken controllers and respective channels. A SERDES allocator 156 allows allocation of SERDES lines through quad M-PHY units 158 to the communication systems 150, 152 and 154. Each of the controllers of the communication systems 150, 152, and 154 may access the high bandwidth memory 148.

In this example, the array 130 of directly interconnected cores are organized in tiles with 16 cores in each tile. The array 130 functions as a memory network on chip by having a high-bandwidth interconnect for routing data streams between the cores and the external DRAM through memory IO processors (MIOP) 134 and the high bandwidth memory controller 146. The array 130 functions as a link network on chip interconnection for supporting communication between distant cores including chip-to-chip communication through an "Array of Chips" Bridge module. The array 130 has an error reporter function that captures and filters fatal error messages from all components of array 130.

Figure 2A:
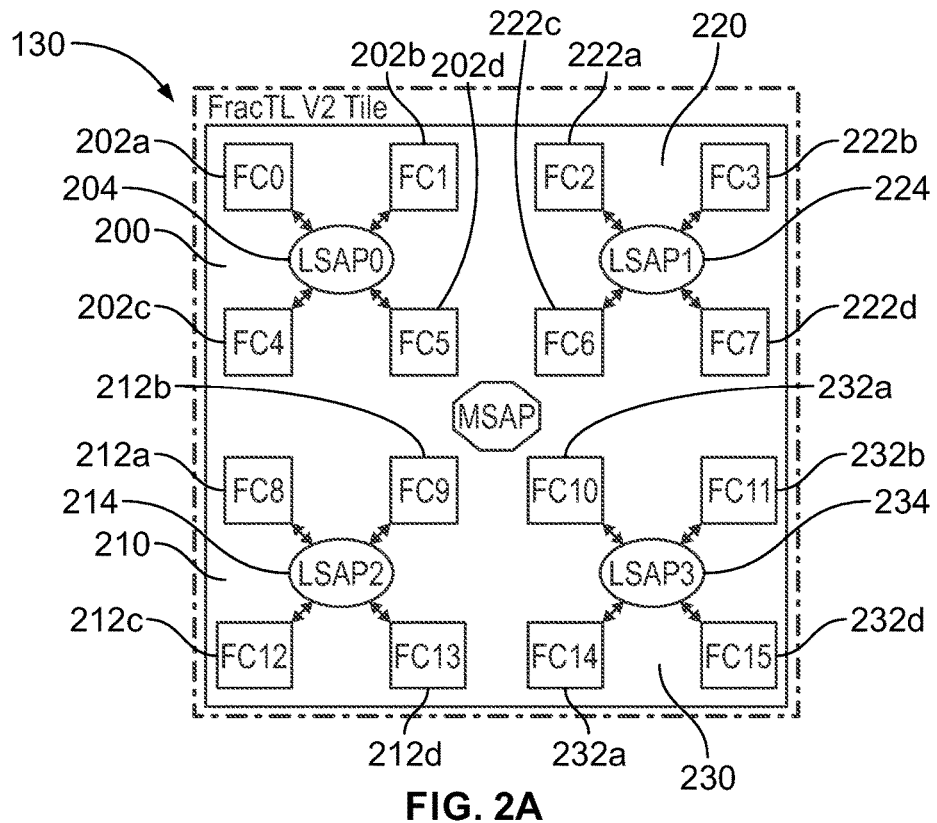
FIG. 2A is a block diagram of the array of cores in the die in FIG. 1B.
Figure 2B:
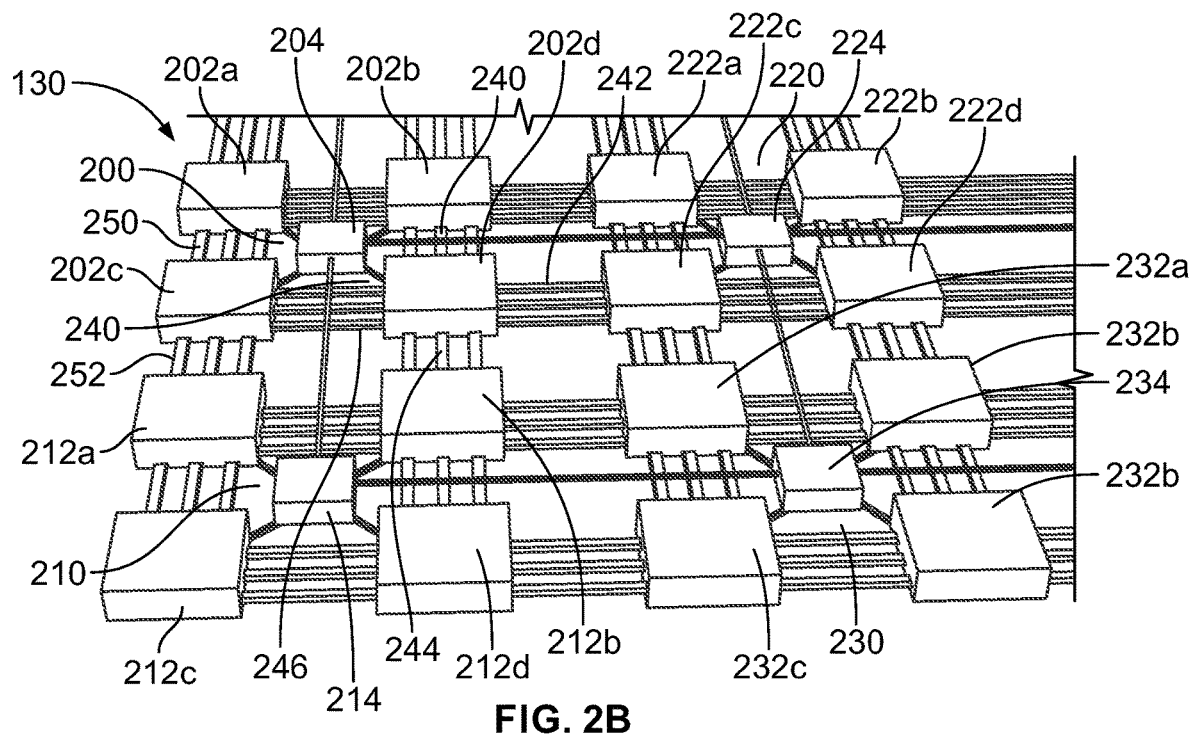
FIG. 2B is a three-dimensional view of the array of cores in the die in FIG. 1B.

FIG. 2A is a detailed diagram of the array of cores 130 in FIG. 1B. FIG. 2B is a three-dimensional image of the array of cores 130 in FIG. 1B. The array of cores 130 is organized into four core clusters such as the clusters 200, 210, 220, and 230 shown in FIG. 2A. For example, the cluster 200 includes cores 202a, 202b, 202c, and 202d. Each of the four cores in each cluster 200 such as cores 202a, 202b, 202c, and 202d are coupled together by a router 204. FIG. 2B shows other clusters 210, 220, and 230 with corresponding cores 212a-212d, 222a-212d and 232a-232d and corresponding routers 214, 224, and 234.

As may be seen specifically in FIG. 2B, in this example, each of the cores 202a, 202b, 202c, and 202d has up to four sets of three interconnections [L, A, R]. For example, a core in the center of the array such as the core 202d includes four sets of interconnections 240, 242, 244, and 246 each connected to one of four neighboring cores. Thus, core 202b is connected to the core 202d via the interconnections 240, core 202c is connected to the core 202d via the interconnections 242, core 212b is connected to the core 202d via the interconnections 244, and core 202c is connected to the core 202d via the interconnectors 246. A separate connector 248 is coupled to the wire router 204 of the cluster 200. Thus, each core in the middle of the array, has four sets of interconnections, while border cores such as the core 202c only have three sets of interconnections 250, 252, and 246 that are connected to respective cores 202a, 202d, and 212a.

Figure 2C:
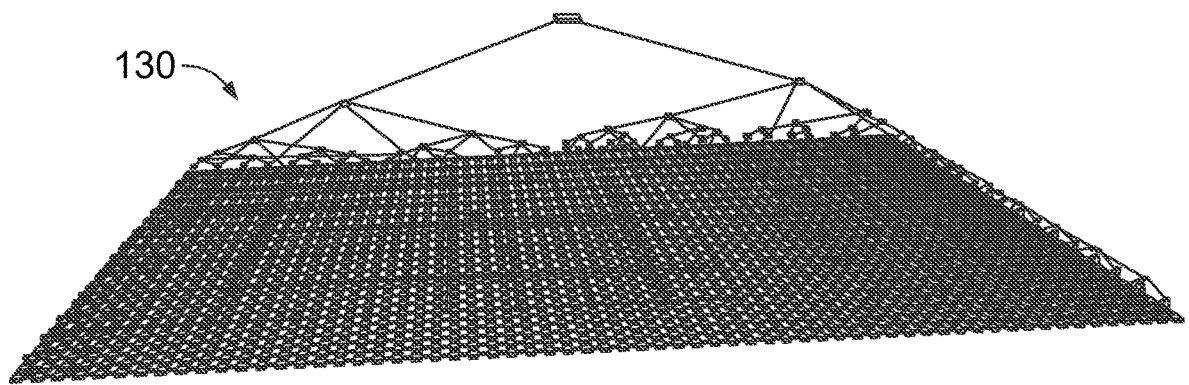
FIG. 2C is a three-dimensional view of the array of cores that is suitable for selection for implementation of different operations.

FIG. 2C is a perspective view of the cores of the array of cores 130. Areas of cores on the array are selected for a layout of selected cores that perform a program or computational function such as matrix multiplication. Assuming all the cores are functional, the layout of cores for a program function ideally is as densely laid out as possible. Such an ideal topology may be defined as the layout for a 100% yield MPPA fractal array chip. However, the ideal topology layout needs to be adjusted to avoid including any malfunctioning cores in the array.

Figure 3:
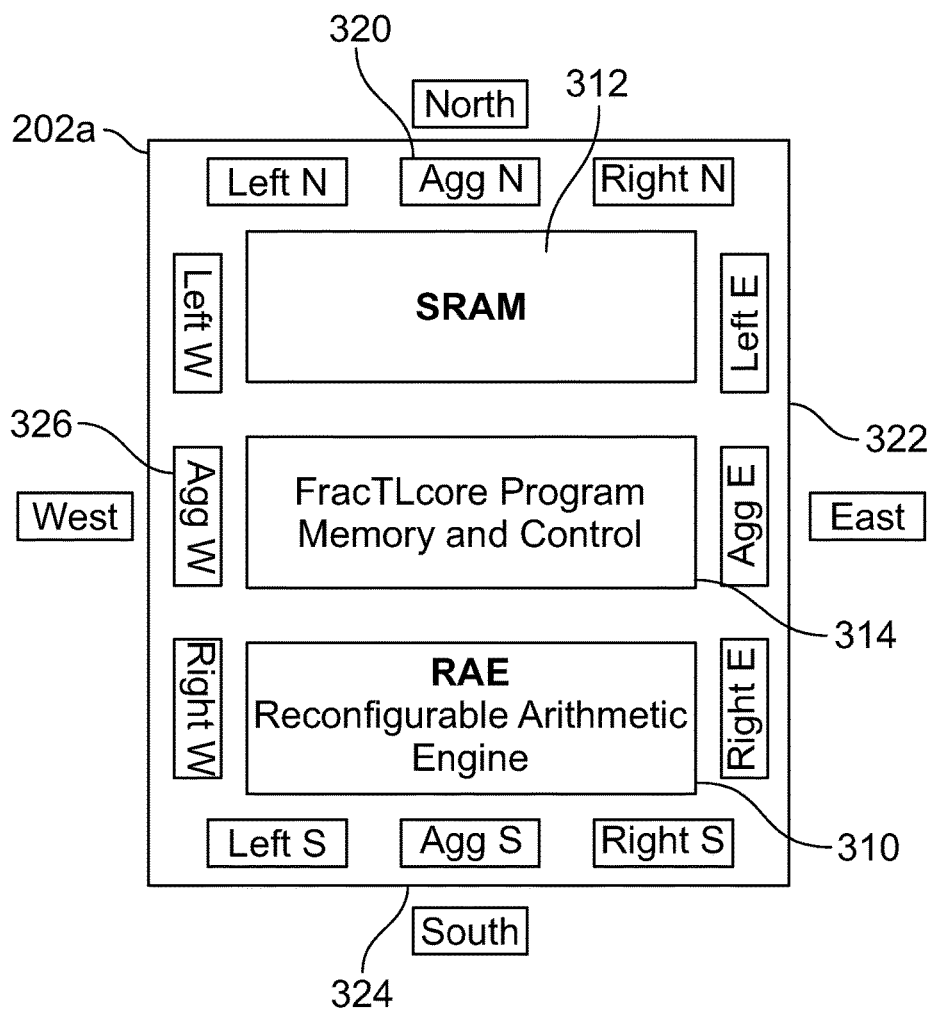
FIG. 3 is a block diagram of one of the cores of the array of cores in FIG. 2A.

FIG. 3 is a block diagram of one of the cores in the array 130 such as the core 202a in FIG. 2A. Each of the cores in the array of cores 130 includes an arithmetic logic unit (ALU) or reconfigurable arithmetic engine 310, a memory 312 such as static random access memory (SRAM), and program memory and control module 314. The reconfigurable arithmetic engine 310 performs data manipulation operations. The program memory and control module 314 executes data flow programs. Each core includes inner-connectivity data input/output to neighboring cores, and outer connectivity to devices outside of the array of cores 130. In this example, the core includes four sets of interconnections (A, L, R) including a north set of interconnections 320, an east set of interconnections 322, a south set of interconnections 324, and a west set of interconnections 326.

In this example, each of the cores may be configured for various computation modes including: (a) numeric, logic and math operations; (b) data routing operations; (c) conditional branching operations; and (d) implementations of all these operations in any or all data types such as Boolean, integer, floating point, or fixed-point types. Each of the cores in the array of cores may be programmed to perform functions such as numeric, logic and math operations, data routing operations, conditional branching operations, input processing, output processing, and being a "wire" (serving as a connector) between other cores. Data may be exchanged between the cores in the array of cores 130 through the interconnections between the cores and the router structures explained herein. The data may include any or all data types such as Boolean, integer, floating point, or fixed-point types.

Figure 4:
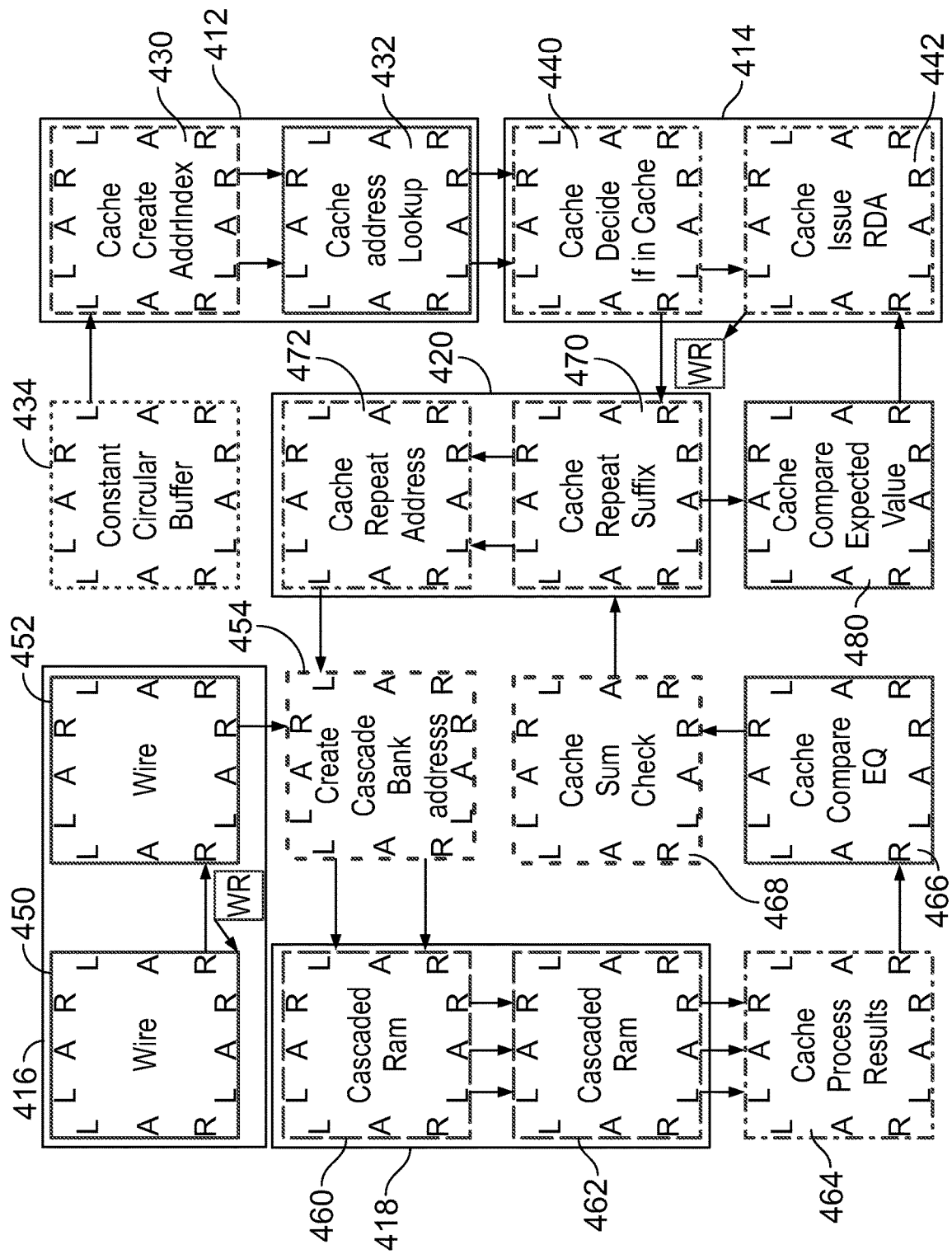
FIG. 4 is a block diagram of an example cache architecture that enables access to a cache for the cores the array of cores in FIG. 2A.

FIG. 4 shows an example cache architecture 400 composed of 16 cores of a tile of the array of cores 130. The cores in the architecture 400 are configured to function as a memory cache to support computational operations of other cores in the array of cores 130. Other cores in the array 130 may access the core architecture 400 when computational operations executed on such cores require data. The data may be initially stored in an external memory such as the HBM 148 in FIG. 1B. Once the data is accessed once, it is stored in a set of cores in the core architecture 400 that are configured as cache memory. This allows more rapid access on subsequent accesses to the cached data by the configured cores. The cache architecture 400 is a small piece of memory on die that is faster to access than the external HBM 148. The cache architecture requires some chip area and thus the number of cores dedicated to the architecture 400 should be limited. Different applications executed by other cores on the array of cores may have different data access patterns. For example, a word processer memory access pattern will look different from a 3D graphics render engine. The cache architecture 400 thus allows changing the cache line length and the bits used to track data present in the cache to tune the cache hit and miss rate.

The example cache architecture 400 includes five primary blocks including a cache address manager 412, a return data module 414, a high bandwidth memory (HBM) manager 416, a cache module 418, and a create address module 420.

The cache address manager 412 includes a first core 430 configured to create and maintain a cache address index and a second core 432 configured to look up the cache address in the cache address index maintained by the core 430. When cores in the array of cores 130 that are configured for computational operations require either reading data from memory or writing data to memory, requests are received by the cache address manager 412. A core 434 is configured as a constant circular buffer that stores the current request until a response is completed to the request by the cache architecture 400. The L interconnection of the circular buffer core 434 is connected to the L interconnection of the core 430. The cache addresses from the cache address index for the requested data by the core 430 are passed to the core 432 via the L interconnection between the core 430 and core 432. The input address is passed unmodified on the L interconnection. The R interconnection between the core 430 and the core 432 is the index data for lookup in the cache module 418 to determine if the cached data is present or not. The index data has a suffix bit set for a cache hit or cache miss for the data. The core 432 is configured to look up cache addresses received from the core 430 in a cache address index. Each of the addresses in the cache address index is the start of a cache address line.

The cores 430 and 432 implement an algorithm for tracking what data is kept in the cache module 418. The address being requested is manipulated to create a tracking location via the cache address index in a table for the addresses of the cache module 418. The goal of the algorithm is to keep the most frequently accessed data stored in the cache module 418. The algorithm allows optimization of cache access for different patterns for different applications. The algorithm thus changes the cache line length and the bits used to track data being present in the cache to tune the cache hit and miss rate. For example, for a 32 bit address for memory, bit 31 is the high bit of address and bit 0 is the lowest bit of the address. A cache index may be created from different order bits of an address. For example, bits 9:0 may be used to to create a 1024 entry cache table or bits 31:22 may be examined. In general, larger data will have an address index with higher value bits while data that is relatively smaller will have an address index with lower value bits. These will have very different cache hit/miss ratios. The example cache index may be created from bits scattered throughout the address field of the address of the data. The index may be used to determine whether the data is stored in the cache module 418 by determining if the address of the data matches the address of the index.

The looked up cache addresses are passed from the core 432 to a core 440 in the return data module 414 via the L interconnection between the cores 432 and cores 440. The R interconnection between the cores 432 and 440 passes the cache index with the suffix bit 3 set for whether there is a hit or miss for the data in the cache. The core 440 is configured to determine whether the cache address of the requested data is present in the cache module 418 based on reading the suffix bit 3. If the suffix bit indicate that the data is a miss, indicating the data is not stored in the cache module 418, the core 440 sends a memory random access read request for a cache line length on the L interconnection to a core 442 that is configured to send a read request data signal. In this example, the cache line length is 8 bytes, but other cache line lengths may be used. The core 442 is coupled to the HBM manager 416 to retrieve the data from the HBM 148 through a core configured for connection to the MIOP 134 and HBM subsystem 146 in FIG. 1B, if the data is not stored in the cache module 418. If the requested data is stored in the cache module 418, the data is requested to be retrieved from the cache module 418 as will be described below.

The HBM manager 416 includes cores 450 and 452 that are configured as wire cores to send a memory request to an off chip memory such as the HBM 148 in FIG. 1B through the HBM controller 146. The memory request is generated by the core 442 and the data is returned from the core configured for connection to the MIOP and HBM subsystem. The requested data is returned from the HBM 148 through the HBM manager 416. The wire cores 450 and 452 of the HBM manager 416 are coupled to each other via the R interconnection. Data read from the HBM is sent through the R interconnection of the wire core 450. The R interconnection of the wire core 450 is coupled to a core 454 that is configured to store a bank address table and create a cascade bank address in the cache module 418 for the data. The data in the L interconnection includes a suffix bit indicating whether the data is being read from or the data is being written to the cache module 418. The core 454 passes the returned data from the HBM 148 via the R interconnection to the cache module 418. The core 454 passes the created address in cache module 418 corresponding to where the data will be written via the L interconnection to the cache module 418. The returned data is merged with the stream of addresses for writing to the cache memory module 418. The cache address index is updated on the core 430. The core 432 determines if the requested data is present in the cache module 418 by comparing the address to the address in the cache index address table. If the data is not in the cache (Cache Miss) then the address index is updated to the new address of data that will be put into the cache module 418. Subsequent requests would find the same address in the cache (Cache hit).

In this example, the cache module 418 includes two cores 460 and 462 that are configured to allow the internal RAM on each of the cores 460 and 462 to constitute the cache memory. In this example, the two cores 460 and 462 allow 4 kbytes each of cache storage. However, more cache storage could be made available by having larger RAM or more cores in the cache module 418. In this example, the L interconnections of the cores 460 and 462 accept address data, written data is sent or received over the R interconnections, and read data is sent or received over the A interconnections.

The cache module 418 returns the requested data (either existing data from the cache RAM or data newly written into the cache RAM from the external HBM) to a core 464 configured to output cache process results. In this example, a suffix indicating whether the data is hit in the cache or missed in the cache is passed on the L interconnection from the core 462 configured as cache memory to the core 464. In the case of a miss, requiring data access to the external HBM memory, the accessed data is passed via an R interconnection to the core 464. The accessed data is written to the cache module 418 for availability for subsequent computational memory requests. In the case of a hit, the read data from the cache module 418 is passed via the A interconnection to the core 464. The data is thus routed from the core 464 to the cores that requested data access to the architecture 400. The core 464 selects either the A or R interconnection for routing the data based on the suffix bit indicating a hit or a miss in the address read from the L interconnection.

In this example, certain cores 466, 468, and 480 are configured for testing purposes. For testing purposes, the core 464 passes the data to a core 466 and a core 468 via respective R interconnections. The core 466 is configured to compare the output of the cache solution to the expected output. A value of one is set for a match or a value of 0 for a mismatch against what the expected output values are. The core 468 is configured for performing a check sum operation and determining if the check sum shows proper transmission of the expected data. The result of the check sum is passed through the A interconnection through a core 470 to a core 480 configured to output the results of the check sum. The checksum is of the compare results. All values are expected to match to indicate successful data transfer. The testing operations that are performed by the cores 466, 468, and 480 are not generally employed in normal memory access operation of the architecture 400.

The address return module 420 includes the core 470 that is configured for repeating a cache suffix and a core 472 configured for repeating a cache address. The address return module 420 thus repeats addresses corresponding to locations in the cores 460 and 462 that constitute the cache memory module 418. The address includes the cache suffix bit for whether data is a cache hit or a cache miss. A series of addresses are repeated for writing or reading data from the cache module 418. The number of addresses repeated is based on the cache line length. In this example, the cache line length is 8 bytes and thus there may be a maximum of 1K addresses created for the example 8 kb cache size in this example. The type of request (read or write) is also repeated. In this example, the suffix determines whether the data is read from or written to the SRAM of the cores of the cache module 418.

If the core 440 determines that the requested data (for either reading or writing) is already stored in the cache module 418, the core 440 sends the address to the core 470 configured for repeating the cache suffix via the R interconnection. The suffix bit is passed from the core 470 via the L interconnection to the core 472 configured for repeating the cache address of the data. The cache index address is passe via the R interconnection between the core 470 and the core 472. Both the suffix and address are repeated by the cores 470 and 472 in order to allow access to the address in cache module 418 that stores the requested data. The address and the suffix bit indicating a read (cache hit) in this example is passed to the core 454 via the L interconnection between the cores 454 and 472 to access the cache module 418. The desired data is then sent through the A interconnection, indicating a hit, and the requested data is read from the cache module 418 to the core 464.

The example cache architecture 400 is not a fixed setup. The architecture 400 can be tailored by the software developers for their specific use case and configuration of the cores in the array of cores 130. The size of the cache can be changed by configuring additional cores as part of the cache module 418. The method of tracking what data is kept in the cache can be changed by changing the index calculation performed by the core 430. The cache line length can be changed by adding additional cores to the cache module 418 and changing the address repeat amount on the cores 470 and 472 to accommodate the additional cores. The bank address table in the core 454 is updated to have a bank address for each additional core in the cache module 418. The cache line length determines how large of a request is made from HBM memory 148. Changing the cache line length can help optimize application performance.

Figure 5:
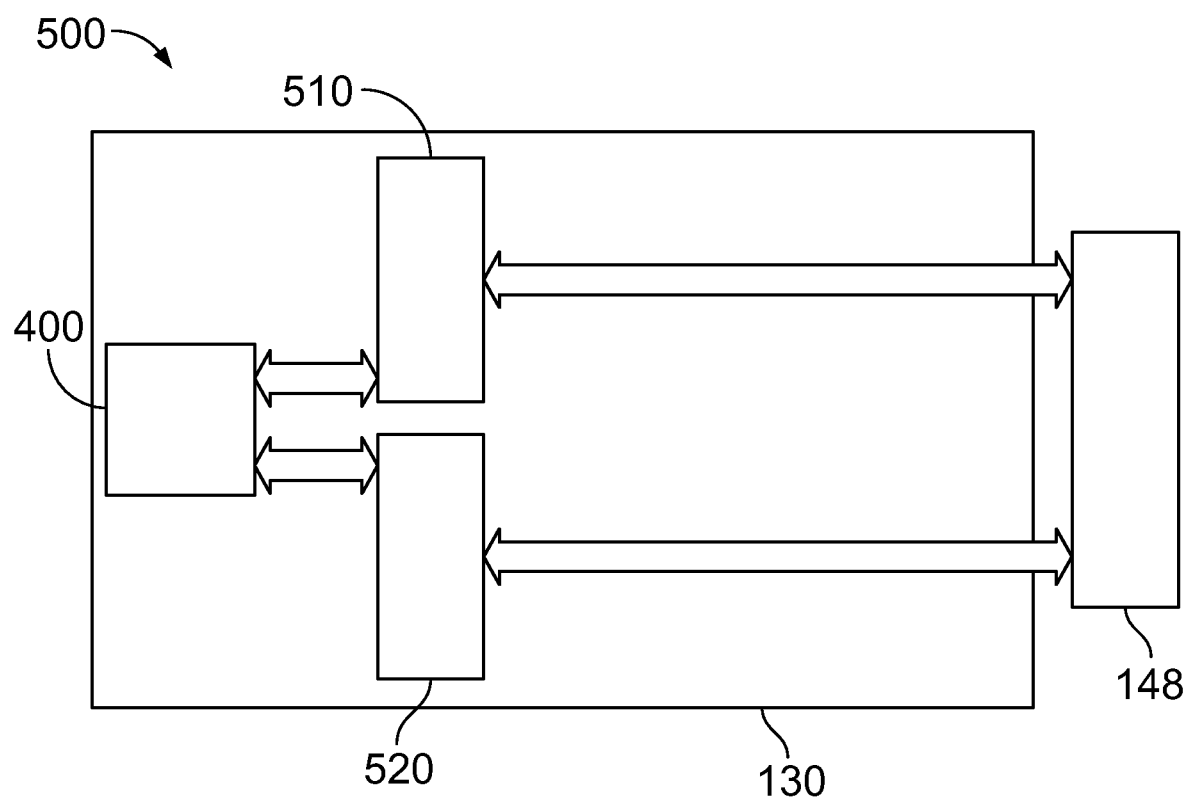
FIG. 5 is a block diagram of an example configuration of the array of cores including the cache architecture in FIG. 4.

FIG. 5 is a block diagram of an example configuration 500 of the array of cores including the cache architecture in FIG. 4. In this example, the array of cores 130 includes a first set of cores 510 that have been configured for a first computational operation. A second set of cores 520 have been configured for a second computational operation. Both sets of cores 510 and 520 may have read and write memory requests routed through the interconnection network in the array of cores 130 described above. The array of cores 130 allows access to the high bandwidth memory 148 that is external to the array of cores 130. Memory access requests from either the first set of cores 510 or the second set of cores 520 are routed to the cache architecture 400, which may include one or more tiles configured to serve as the cache architecture 400. If the requested data is found in the cache memory module of the cache architecture, operational execution is streamlined based on the quicker access to the data for either operation performed by the respective sets of cores 510 and 520.

As explained above, the cache architecture 400 may be expanded to increase the size of available cache memory. The access may also be increased by sizing of the cache line length. These parameters may be adjusted depending on the requirements of the cores that are configured for computational operations. These parameters may also be adjusted during operation of the cores configured for computational functions in real-time. For example, if certain computational functions require faster memory access, the configured cores may expand the cache during the execution of the functions by configuring additional cores for the cache memory module. Typically if an application is directed toward a known type of data the cache design configuration may be tailored toward such data. After the completion of executing a program, the cores of the cache architecture may be configured for another purpose. Alternatively, the cache architecture may serve as a cache for another group of cores executing another program.

In addition, cores used for the cache architecture may be reconfigured for other purposes once computations operations change or the sets of cores for computational operations are reconfigured themselves. Each set of cores configured for a computational operation may alternatively have their own dedicated cache architecture similar to the cache architecture 400.

Figure 6:
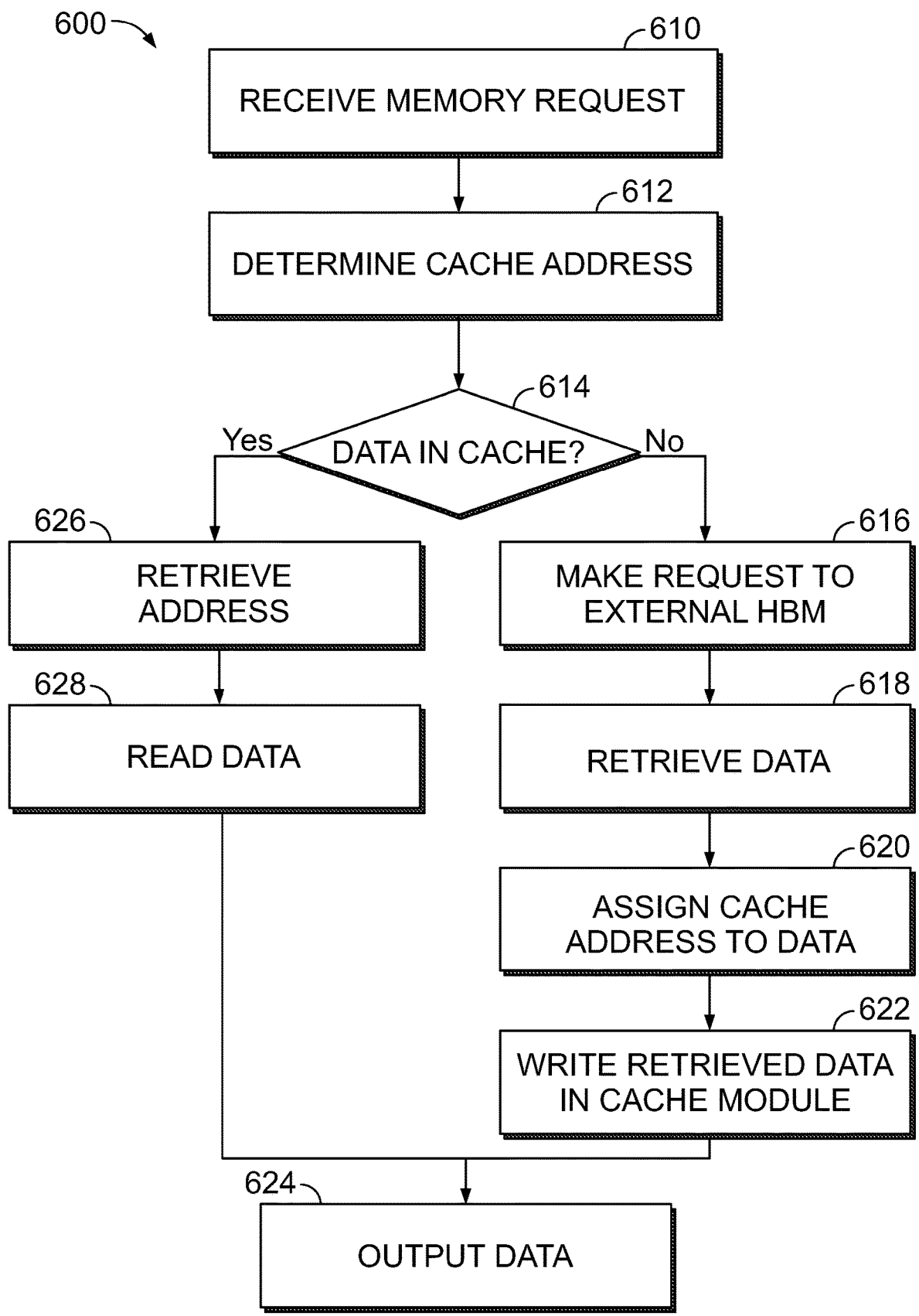
FIG. 6 is a flow diagram of the process of accessing data stored on the example cache architecture.

A flow diagram 600 in FIG. 6 is representative of example machine readable instructions for the process of accessing data using the example cache architecture in an array of cores. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 6, persons of ordinary skill in the art will readily appreciate that many other methods of implementing the example machine readable instructions may alternatively be used. For example, the order of execution of the blocks may be changed, and/or some of the blocks described may be changed, eliminated, or combined.

An initial direct memory access is received from a computational unit (600), which may be a set of cores of the array of cores 130 configured to perform computation operations. A set of cache addresses is determined from the data access request (612). The routine then determines whether the requested data is stored in the cache module (614). If the data is not found in the cache, the data is requested from the external memory such as the HBM (616). The data is then retrieved from the external memory (618). A cache address is assigned to the retrieved data (620). The retrieved data is then written at the address in the cache (622). The data is then returned to respond to the request (624).

If the data is already stored in the cache (614), the routine retrieves the address of the data (626). The address is passed the cache and the requested data is read from the cache (628). The requested data is then output to respond to the request (624).

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A cache architecture for an array of identical cores arranged in a grid, each of the cores including interconnections to neighboring cores in the grid, a memory, and an algorithmic logic unit, the cache architecture comprising:
    a first core of the array configured to receive a memory access request for data from at least one core of the array of cores configured to perform a computational operation;
    a second core of the array configured to determine whether the requested data is present in a cache memory via a cache index including addresses in the cache memory; and
    a third core of the array configured as the cache memory, wherein the memory of the third core is used as the cache memory, wherein an address of the requested data from the cache index is passed to the third core to output the requested data.

2. The cache architecture of claim 1, further comprising a memory of a fourth core of the array configured as the cache memory in combination with the memory of the third core.

3. The cache architecture of claim 1, further comprising a fourth core of the array configured to manage an external memory, wherein the requested data is written to the third core from the external memory when the requested data is not present.

4. The cache architecture of claim 3, wherein a suffix of the address is used to designate whether the retrieved data is retrieved from the cache memory or the external memory.

5. The cache architecture of claim 3, wherein the external memory is a high bandwidth memory.

6. The cache architecture of claim 1, wherein the data is retrieved via a cache line having an adjustable cache line length.

7. The cache architecture of claim 3, wherein each of the cores in the array have a first channel, a second channel and a third channel that may each be interconnected to the corresponding first, second and third channels of another core, wherein the third core accepts an address of the requested data on the first channel, outputs the requested data on the second channel if the data is written from the external memory, and outputs the requested data on the third channel if the data is stored in the cache memory.

8. The cache architecture of claim 1, further comprising a fourth core of the array coupled to the third core, the fourth core configured to return the requested data to the least one of the cores in the array configured for the computational operation.

9. The cache architecture of the claim 1, wherein the at least one core configures a fourth core as the cache memory in response to being configured to perform the computational operation.

10. A method of providing a cache memory for an array of cores arranged in a grid, each of the cores including interconnections to neighboring cores in the grid, a memory, and an algorithmic logic unit, the method comprising:
    configuring a first core of the array to receive a memory access request for data from at least one core of the array of cores configured to perform a computational operation;
    configuring a second core of the array to determine whether the requested data is present in a cache memory via a cache index including addresses in the cache memory; and
    configuring a third core of the array as the cache memory, wherein the memory of the third core is used as the cache memory; and
    passing an address of the requested data from the cache index to the third core to output the requested data.

11. The method of claim 10, further comprising configuring a memory of a fourth core of the array as the cache memory in combination with the memory of the third core.

12. The method of claim 10, further comprising managing an external memory via a fourth core; and writing the external data to the third core from the external memory when the requested data is not present.

13. The method of claim 12, wherein a suffix of the address is used to designate whether the retrieved data is retrieved from the cache memory or the external memory.

14. The method of claim 12, wherein the external memory is a high bandwidth memory.

15. The method of claim 10, wherein the data is retrieved via a cache line having an adjustable cache line length.

16. The method of claim 12, wherein each of the cores in the array have a first channel, a second channel and a third channel that may each be interconnected to the corresponding first, second and third channels of another core, wherein the third core accepts an address of the requested data on the first channel, outputs the requested data on the second channel if the data is written from the external memory, and outputs the requested data on the third channel if the data is stored in the cache memory.

17. The method of claim 10, further comprising returning the requested data to the at least one of the cores in the array configured for the computational operation via a fourth core of the array coupled to the third core.

18. The method of claim 10, further comprising configuring a fourth core as the cache memory via the at least one core of the array of cores in response to being configured to perform the computational operation.

19. A system on chip comprising:
a high bandwidth memory; and
a die including an array of cores coupled to an interconnection network, the interconnection network allowing access to the high bandwidth memory, each of the cores in the array of cores including a memory and an algorithmic logic unit, wherein:
a first core of the array is configured to receive a memory access request for data from at least one core of the array of cores configured to perform a computational operation;
a second core of the array is configured to determine whether the requested data is present in a cache memory via a cache index including addresses in the cache memory; and
a third core of the array is configured as the cache memory, wherein the memory of the third core is used as the cache memory, wherein an address of the requested data from the cache index is passed to the third core to output the requested data.

* * * * *